United States Patent [19]

Dieleman

[11] Patent Number: 4,665,396

[45] Date of Patent: May 12, 1987

[54] VALIDATION CHECK FOR REMOTE DIGITAL STATION

[75] Inventor: Adrianus H. Dieleman, Eindhoven, Netherlands

[73] Assignee: U.S. Philips Corporation, New York, N.Y.

[21] Appl. No.: 793,498

[22] Filed: Oct. 30, 1985

Related U.S. Application Data

[63] Continuation of Ser. No. 475,588, Mar. 15, 1983, abandoned.

[30] Foreign Application Priority Data

Mar. 16, 1982 [NL] Netherlands .......................... 8201077

[51] Int. Cl.⁴ .......................... H04Q 9/00; H04L 9/00
[52] U.S. Cl. ...................................... 380/23; 235/382; 340/825.34
[58] Field of Search ....................... 340/825.34, 825.33; 235/375-385; 178/22.08; 179/2 CA

[56] References Cited

U.S. PATENT DOCUMENTS

| | | | |
|---|---|---|---|
| 4,218,582 | 8/1980 | Hellman | 178/22 |
| 4,298,793 | 11/1981 | Melis | 235/487 |
| 4,310,720 | 1/1982 | Check, Jr. | 235/382 |
| 4,317,957 | 3/1982 | Sendrow | 235/382 |
| 4,349,695 | 9/1982 | Morgan et al. | 340/825.54 |
| 4,423,287 | 12/1983 | Zeidler | 340/825.34 |
| 4,454,414 | 6/1984 | Benton | 235/379 |

Primary Examiner—Donald J. Yusko
Attorney, Agent, or Firm—James J. Cannon; Anne E. Barschall

[57] ABSTRACT

A cryptographic validation for an external station of a communication system provided with a central data processing device, a number of access stations which are coupled thereto and a number of external stations which can be selectively coupled to the access stations. To validate an external station, the access station transmits a message encoded by a first encoding key. The external station decodes the message received and re-encodes the message using a second encoding key, transmitting the re-encoded message back to the access station. The access station then decodes this message using a second key decoder. This decoded data is compared with the data originally encoded by the access station. If the data is identical, the external station is validated.

3 Claims, 3 Drawing Figures

VALIDATION CHECK FOR REMOTE DIGITAL STATION

This is a continuation of application Ser. No. 475,588, filed Mar. 15, 1983, now abandoned.

BACKGROUND OF THE INVENTION

Field of the Invention

The invention relates to a communication system comprising a central data processing device and a number of access stations which are coupled thereto and which are situated in different locations, and also comprising a group of external, portable, pocket-size stations, it being possible to couple an external station to an access station via bidirectional data channel, the relevant access station comprising a message generator for forming a message and an encoder for receiving the message thus formed and for encoding said message by way of a first encoding key in order to apply a first code message thus formed to the data channel, the relevant external station comprising a first decoder for receiving the first code message and for decoding this message by way of a first decoding key which is associated with the first encoding key in order to apply a first reconstructed message to a digital processing device in the relevant external station, a locally present initiation station which is coupled to the external station in an initiation state thereof comprising a generator for applying the first decoding key to the external station. The central data processing device is formed, for example, by the management device of a data bank containing medical data which may be issued to qualified users only; such a user utilizes a predetermined work station which is identified as such. This work station constitutes an external station and the access station is then informed, for example, by a front end processor which takes over given sub-tasks from a central processor. Generally, the central data processing device may be physically distributed. In that case the data channel is formed, for example, by a data network which comprises several front end processors and which can, moreover, be used for a variety of confidential as well as public tasks. However, steps must then be taken in order to inhibit unauthorized requests for confidential information in such a network. Only work stations which are identified as being authorized may utilize the confidential information and the access stations serve to separate the sheep from the goats for each category of confidential information. In a further field of application the central dating processing device acts as the manager of a credit system in which, for example, money can be dispensed upon presentation of an electronic credit card which can be coupled to the communication system. In that case it is again necessary to identify an external station as being legitimate.

SUMMARY OF THE INVENTION

It is the object of the invention to enable a cryptographic check against falsification of such an external station (for example, a work station or an electronic credit card) to be provided in such a communication system, the identification not being linked to the physical location of the external station in the communication system and being performed by transporting in both directions only encoded messages which are virtually impossible to decode by non-authorized access, so that the simulation of a legitimate external station is also impossible, the set-up being such that it is not necessary for each access station to store a separate encoding/decoding key for each external station.

The object is achieved in that according to the invention the relevant external station comprises a second encoder for receiving the first reconstructed message and for encoding this message by way of a second encoding key which is independent of the first encoding key in order to apply a second code message thus formed to the data channel, the relevant access station comprising a second decoder for receiving the second code message for decoding this message by way of a second decoding key which matches the second encoding key in order to form a second reconstructed message, the initiation staton comprising a second generator for applying the second encoding key to the external station in the initiation state thereof, the access station comprising a third generator for unpredictably generating said first message, and also comprising a comparison element for comparing the first message and the second reconstructed message and for generating a confirmation of identity in the case of correspondence, said first decoding key and second encoding key being mutually identical for a number of external stations, but not readable therein.

The invention also relates to a portable, external station which is intended for use in such a communication system and which is designed and proportioned as a credit card. For such credit cards an ISO standard exists, but other dimensions (for example, those of a calling card) with a thickness of from approximately 1 to a few millimeters are also attractive. Preferably, it comprises relevant loops for the contactless transfer of data and power supply energy from an access station and the transfer of data energy back to the access station, a shift register being serially connected between two of said loops for the temporary storage of data received. This results in a simple and safe realization.

BRIEF DESCRIPTION OF THE FIGURES

The invention will be described in detail with reference to some Figures.

DESCRIPTION OF A PREFERRED EMBODIMENT

Figure 1:
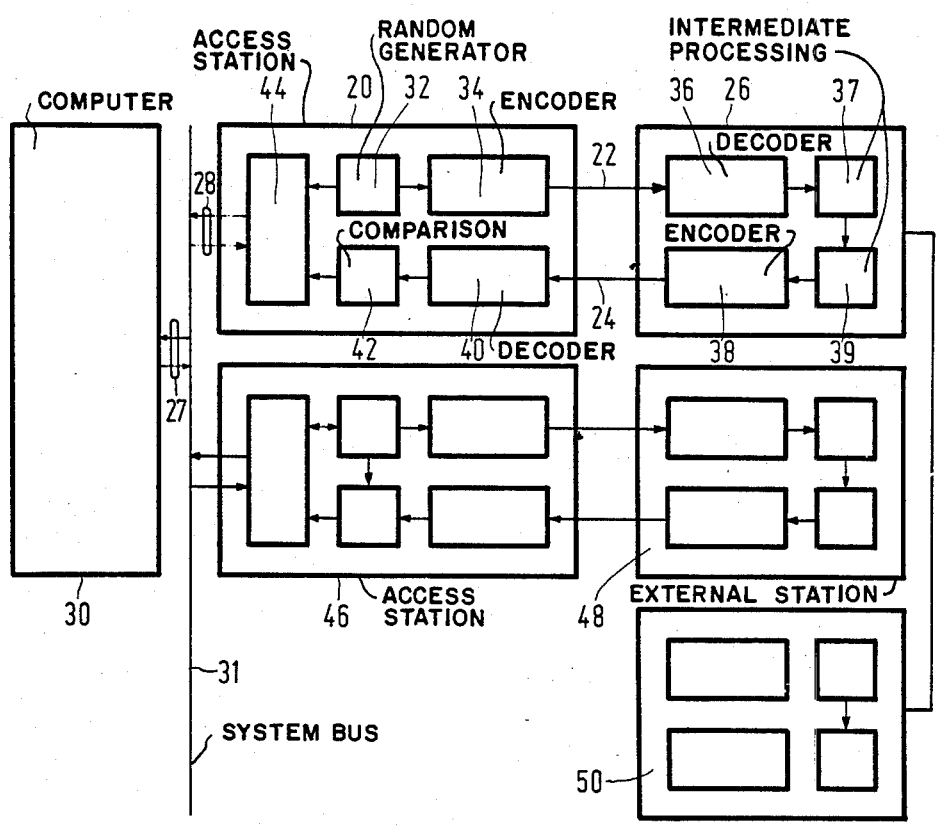
FIG. 1 is a block diagram of a communication system for carrying out the invention.

FIG. 1 is a block diagram of a communication system whereby the invention can be realized; first of all the normal operating state thereof will be described, i.e. not the initialization state. The communication system comprises a central data processing device. This is formed, for example, by a computer (30) which comprises a processor, a program memory, an intermediate or scratchpad memory, a background memory, interface units for peripheral equipment such as a display device comprising a cathode ray tube or a printer, a further interface unit for an external data channel and an internal bus for the transport of data and control signals between the foregoing components. In the described system, such a computer acts as the management unit for a data base (not shown) or a money dispensing system which utilizes electronic credit cards. For the sake of brevity, neither the physical organization of the money dispensation nor the computer itself will be described. Via the bidirectional connection 27, the central data processing device 30 is connected to the system bus or the system network 31. The access stations 20, 46 are also connected to the bus/network 31 via bidirectional connections such as the connection 28. The number of access stations will usually be large; for example, for a credit card system it may exceed 100 and for a management system of a data base, for example, it may be 10 or more. The reference numerals 22, 24 denote an external data channel which may consist of two simplex (unidirectional) connections; alternatively, it may have a semi-duplex or full-duplex construction. The reference numerals 26, 48, 50 denote three external stations (the last station is not coupled to an access station in the situation shown). Per access station there may be no more than one external station in the situation shown here; however, this number may also be much larger, for example when the access station alternately communicates with several external stations by way of a time multiplex organization. The data channel may physically be constructed as a conductor, fiber or wireless medium. The external station 26 can first of all be constructed as a work station or intelligent terminal; it may in principle have the same construction as the central data processing device; on the other hand, it may also comprise means which are smaller in number and/or have a smaller capacity. A further construction may be as described in Netherlands Patent Application 7802132, to which corresponds U.S. Pat. No. 4,298,793 assigned to the assignee of this application. These documents disclose a portable reservation element which can be coupled to an access station for a bilateral data exchange. The reservation element is constructed as a credit card having a slightly increased thickness (a few mm). Thanks to the addition of a small microcomputer, mathematical and/or other operations can also be performed in such a reservation element. By addition of a keyboard and multi-character display means such a credit card is converted into a compact and elementary work station. After validation by the access station, the credit card can enable an amount of money or other materials to be dispensed. An external station in the form of a credit card (portable) may also be used to identify a bearer as being authorized to access given locations or rooms, possibily in combination with a pass-word separately issued to the bearer. The use of passwords and the logic processing thereof, either in the access station or in the external station, is known per se.

The validation of the external station in an isolated location is as follows: the external station first makes a request that it be validated. This request is formed as a data signal which may comprise preamble, postamble and synchronization data. Alternatively, the access station may continuously provide synchronization, for example by way of a clock pulse pattern on the line 22. In the embodiment to be described hereinafter, the data traffic is subdivided into 16-bit data words which are accommodated in a 32-bit traffic word. After the reception of the request for validation, which may possibly involve a pretence of identity, the access station generates a first message M. This message may have an arbitrary content; for example it may be generated by a random generator 32, by a number of bit positions of a counter which is driven by said clock, and the like. This message is encoded in the encoder 34 by means of an encoding key. This encoding key may be the sole key, or it may be selected from a group of encoding keys in accordance with the pretended identity of the external station. On the basis of the first message M, a first code message C1 is thus formed by means of the first encoding operation EC: C1=EC (M). The encoding key, if known, yields the decoding key required for the decoding of the code message C1 only after very complex and hence time consuming operations. Such an operation is actually prohibitively long. The reverse may also be just as time consuming, so that the encoding key cannot be deduced from the decoding key. In that case they are both derived from a common basic key upon initiation of the entire communication system (i.e. not during the initiation of a single external station as will be described hereinafter). In other cases, however, it may be feasible to derive the encoding key from the decoding key, even though the reverse is in any case impossible. Each time the initialization state has been terminated, the required decoding key will be available in the external station 26 after transport to the relevant station via the line 22 or not (or possibly in a different manner). This decoding key, however, cannot be read so that it cannot be applied to the same or another access station 20 at a later stage either. Thus, in the decoder 36 a message M1 can be reconstructed from the code message C1 according to M1=DC (C1) by means of the decoding key DC. The blocks 37, 39 represent further intermediate elements of the external station 26 which may also be arranged in other positions in the path travelled by the signals received, for example regeneration means, storage means and means for adding additional data to the reconstructed message. For example, the reconstructed message may be delayed by a specific time interval, possibly under the control of (a part of) the content of the message M1 itself. Furthermore, for example, data which indicates the identity of the relevant external station 26 may be added to the message M1. In the external station 26 there is also present a further encoding key ET in order to form, in encoder 38, a return code message from the reconstructed and possibly updated message M1 according to C2=ET (M). With this further encoding key there is associated a further decoding key which cannot be derived from the further encoding key. This decoding key DT is present in the access station 20, but cannot be read therefrom, analogously to the first decoding key which cannot be read from the external station 26. Thus, in the decoder 40 a second reconstructed message can be reproduced according to M2=DT (C2) from the reconstructed code message C2. For the relation between the further encoding key and the further decoding key the same is applicable as previously described for the relation between the first encoding key and the first decoding key; notably it is actually impossible to reconstruct the further encoding key. The data M2 and M are not directly linked, provided that in both cases (C1 and C2) the encoding key and the decoding key match. In that case, for example M2=M and the external station can be validated, for example by checking the correspondence between M and M2 in comparison element 42. The output signal "correspondence" thereof can for example, render a blocking element between the connections 28 and 22/24 transmissive, so that the external station can communicate with the central data processing device. The relevant data transport may be non-coded or encoded according to a simple code, or in special cases according to the same code as was used for the validation. The data transport may concern a search or request operation in the data base or a request to the money dispensing system. The check whether the balance of the relevant account is sufficient can be performed in a conventional manner. An attractive code and the associated encoding/decoding keys can be selected in a manner as disclosed in an article by R.C. Merkle and M.E. Hellmann, Hiding information and signatures in trapdoor knapsacks, I.E.E.E. Tr. Inf. Theory, Vol. IT 24, No. 4, September 1978, pages 525, ff. or in U.S. Pat. No. 4,218,582, assigned to Stanford University.

THE CONSTRUCTION OF AN EXTERNAL STATION

Figure 2:
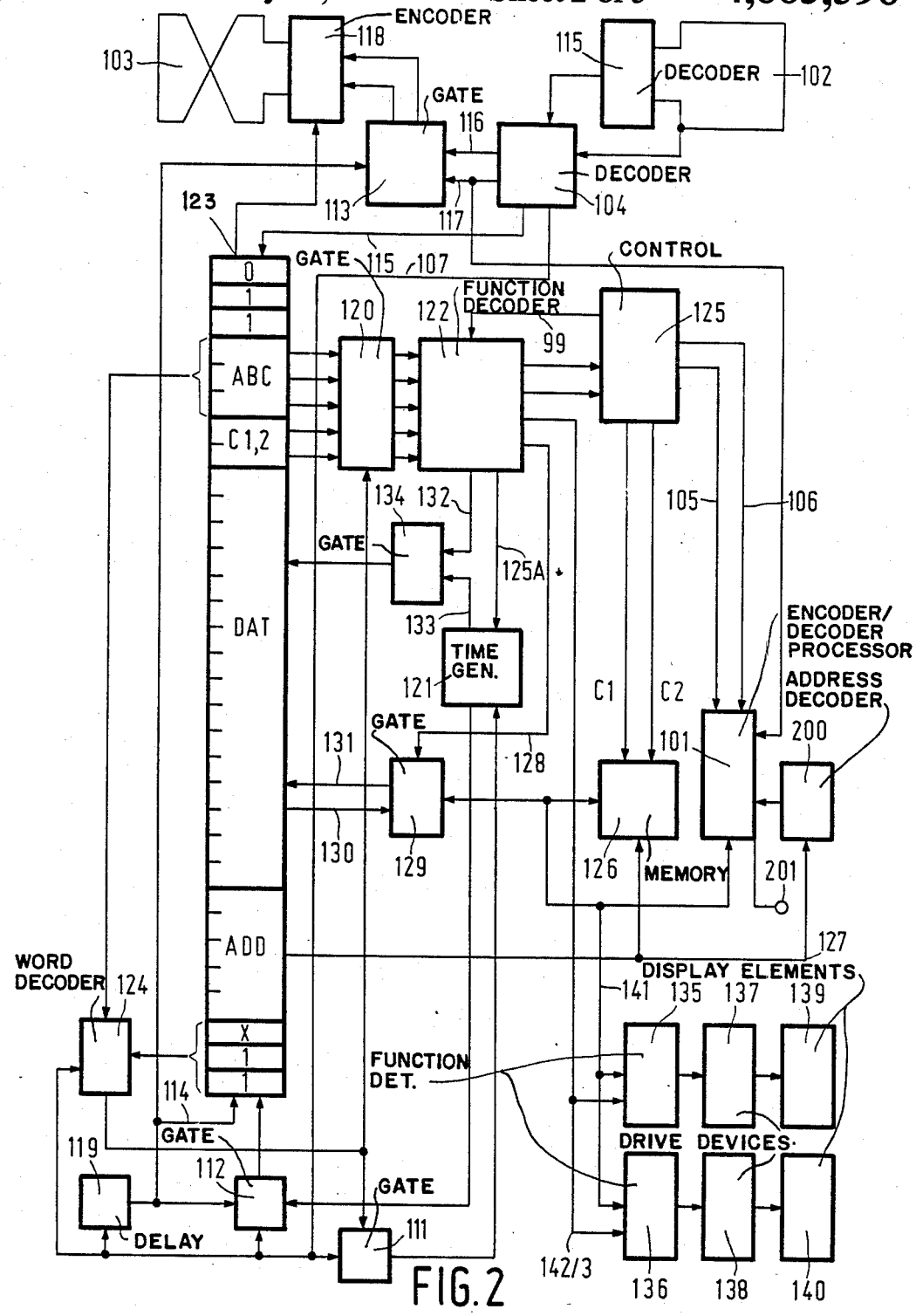
FIG. 2 is a block diagram of an external station.

FIG. 2 is a block diagram of the construction of a portable element which can be used in a system in accordance with the invention. Such a portable element and a reservation system for passenger busses in which the portable element serves inter alia as an intelligent passenger ticket have already been described in U.S. Pat. No. 4,298,793 assigned to the assignee of this application. This Specification is incorporated herein by way of reference. For the sake of brevity, a number of parts of this element which are not very specific will not be described herein. The Figure shows two inductive pick-up loops 102, 103 which comprise 10 turns and 1 turn, respectively; these loops are positioned along the circumference of a square of approximately 5×5 cm. The signal transfer between these loops and corresponding loops in the access station is good when they are spaced, for example, from 2 to 6 mm apart in a corresponding and parallel position. The frequency of the signals used is, for example, in the neighbourhood of 100 kHz. The loops are constructed as printed wiring with a wire thickness of approximately 0.2 mm (slightly more for the loop 103 which is the transmission loop which dissipates more energy). The power supply energy is also transferred in wireless form from which direct voltages of +70, +5, 0, −28 volts are formed. These subsystems have been omitted for the sake of brevity. The loop 102 is suitable for receiving the data signal transmitted by way of a known frequency modulated system with a fundamental frequency of approximately 100 kHz, a modulation depth of 10%, so approximately 10 kHz, and a bit rate of approximately 1 kHz. Element 115 is a detector for the frequency modulation and comprises a known phase-locked loop (PLL). The output signal thereof is applied together with the signal from loop 102, to the decoder 104 for the frequency-modulated signal. This decoder acts as a local clock and generates a clock pulse series which is adapted to the bit rate and which has a recurrence frequency of approximately 2.5 kHz in this case. The clock pulse series is applied, via line 107, to delay element 119 and to gate 111. Due to the delay in the element 119, in the first instance the gates 112 and 113 are blocked and, via input 114, the shift register 123 is cleared, in which state it remains for the time being. Switch-on phenomena are thus bridges. On line 115, the decoder 104 also produces the data signals reconstructed from the input signal (for the time being, however, nothing is stored in the shift register 123) and also, alternately on the lines 116, 117, a dual clock pulse for the gate 113 which remains blocked for the time being. If, contrary to the foregoing, the relevant portable element is not correctly positioned along the access station, however, the entire circuit remains the rest state. After approximately 0.03 seconds, the delay time of the element 119 has expired and the gates 113 and 112 become conductive. The signal on the reset input 114 of the shift register 123 also disappears, so that this shift register successively stores the data bits serially received on the input line 115. The shift register 123 has a capacity of 32 bits and, if nothing further happens, the bit received are applied to the data encoder 118, via the serial output 100 of the shift register 123, after some time. The data encoder is controlled by the dual clock pulses on the lines 116, 117 which are conducted by the gate 113. The output of the data encoder 118 is connected to the transmitter loop 103 for the transfer of data bits to the access station. Element 124 is a word detector which is connected to the first three positions and the last three positions of the shift register 123 in order to detect, by way of a number of start and stop bits of prescribed value, the presence of a 32-bit data word. The presence of such a data word in the shift register 123 is detected by the word detector 124, one half clock pulse period later. The detection signal is applied to the gates 120 and 111. The signal from the gate 111 starts the time generator 121. The time generator 121 first of all applies a signal to the gate 112 which is thus blocked, so that the shift register 123 does not receive further data clock signals. In response to the opening of the gate 120, the function decoder 122 receives the five bits C1, C2, A, B, C of the data word present in the shift register 123. First of all the decoder 122 applies a signal, via the line 125A, to the time generator 121 in order to control the blocking time for the gate 112 which is to be generated therein. Furthermore, the values of the bits C1, C2 are conducted to the control element 125 which forwards the values of the bits C1, C2 also to the memory 126. The function controlled by these bits will be described later. On the line 127 the memory 126 and the control element 125 also receive a five-bit address which originates from five predetermined bit positions of the shift register 123. In accordance with the value of the bits C1, C2, a read, erase, write or dummy operation is performed in the memory 126. The control element 125 contains fixed information of two memory addresses in the memory 126 which are not used. These two memory addresses act as read control command and write control command, respectively, for the encoding/decoding processor 101; the relevant control signals are transported via the lines 105, 106. Under the control of one of these two memory addresses, the memory 126 is not activated, for example by the blocking or modification of one of the bits C1, C2 received. On the other hand, the line 99 can return a signal to the function decoder 122 in order to prevent the display (see later) of the information of such a protected address location. Such a protected address can be stored in the form of permanent wiring by way of a logic gate, for example the address (00000) by a five-input logic NOR-gate. Said blocking or modification can also be performed by means of a logic gate.

When communication is required between the memory 126 or the processor 101 and the shift register 123, the gate 129 receives a control signal from the function decoder 122 via the line 128. The gate 129 is constructed as a so-called tri-state buffer and has three states: 1, 0 and "terminated by a high impedance". In the first two states, the gate is conductive in both directions and the logic state is determined by an externally impressed signal. The direction of signal transport is determined by a relevant control signal from the signal source (elements 101, 123, 126). In the high impedance state, communication between memory and display device is possible, if desired, as will be explained hereinafter. In the case of communication with the shift register, read operations are performed therein via line 130 or write operations via line 131. All data paths to/from gate 129 have a width of sixteen bits. When data is loaded into the shift register, the function decoder 122 supplies an appropriate signal on line 132, while under the control of a signal from the time generator 121 on line 133, the gate 134 supplies the loading signal (parallel loading) to the shift register 123. The function of the memory 126 is controlled in accordance with the following two-bit codes (C1, C2): 01: erase word; 00: write word in the memory from shift register; 10: read word from memory and write in shift register and/or display elements (see later); 11: no action. The memory 126 is a random access read/write memory with static storage and has a capacity of 32 words of 16 bits in this example (type ER 2050, General Instrument).

The function decoder is not only suitable for the described operation, but also for the decoding of the three bits A, B, C which control the function of the display device. In the present embodiment, the display device comprises two function determining devices 135, 136, two drive devices 137, 138 and two display elements 139, 140, for two seven-segment characters each. The data to be displayed appears on line 141 as an eight-bit code. In the elements 135, 136 this code is translated into two seven-segment codes. Furthermore, at the most one of the elements 135, 136 receives an energizing signal from the function decoder 122 via the lines 142 and 143, respectively. The energizing signal may comprise two frequency components, that is to say one component of approximately 50 Hz and one component of approximately 6000 Hz. The elements 135, 136 also receive a selective signal from the time generator 121 in order to activate the display elements 139, 140 for a predetermined time interval only. In the foregoing, the 50 Hz frequency is intended for writing and the 6000 Hz frequency is used for erasure. The drive elements 137, 138 provide impedance matching; as has already been stated, the power supply connections have been omitted for the sake of brevity.

After expiration of the time generated in the time generator 121, the blocking signal for the gate 112 ceases and the shift register 123 receives clock pulses again. Consequently, the data in the shift register 123 is shifted further and the element 124 no longer detects the required combination of start bits and stop bits. Thus, the gates 111 and 120 are blocked so that the time generator 121 and the function decoder 122 are no longer driven. The content of the shift register is thus shifted to the data encoder 118 and is subsequently transmitted by way of the coil 103. A logic "1" is represented by a transition on the positive-going edge of the odd and on the negative-going edge of the even clock pulse within a bit cell, a logic 0 being represented only by the latter transition.

The principal data flows in the memory-display system are from the shift register to the memory and/or display device, and from the memory to the shift register and possibly the display device. Thus, the code bits A, B, C signify: 111: display unmodified; 001: write bus number; 010: write destination number; 011: write bus number and erase destination number; 100: write destination number and erase bus number; 101: erase bus number; 110: erase destination number; 000: erase bus number, erase destination number. At the instant at which a data word is detected by the word detector 124, the start bits 1–3 must have the correct value "11x", and the stop bits 30–32 must have the value "110". Bit 3 is a spare bit. The five bits 4–8 form an address for the memory 126 or the processor 101. The bits 9–16 form data for the memory 126 or the processor 101. The bits 17–24 form data for the memory 126, the processor 101 and/or the display device 126. The bits 27, 28, 29 also control, by way of the function decoder 122, the mode of the display device. These two sets of bits, therefore, may have mutually independent values. The bits 30, 31 are stop bits and have the obligatory value "1". As a further stop bit, the bit 32 has the prescribed value "0". When said five start/stop bits have a different information pattern, no word is detected by the device 124 so that the shift register 123 continuously receives shift pulses via gate 112.

The encoding/decoding processor 101 is connected parallel to the memory 126 and acts as a so-called "black box" for the environment. Under the control of signals on the lines 105, 106, a write operation is performed in an input register or a read operation is performed in an output register, the other elements of the processor having a connection to the environment; consequently, they cannot be read under external control. This processor may mainly be of a conventional type comprising a read-only memory, a read/write memory, an arithmetic and logic unit, and several registers, these components being interconnected by means of an internal bus. Using the data of the read-only memory, the decoding algorithm and the encoding algorithm can be performed on the data received. The processor 101 is connected to the gate 129 and to the control lines 105, 106. It also receives clock pulses from the line 117 which are used for the synchronization of the internal clock. The latter operates with a frequency which is high enough to complete the decoding (encoding) algorithms within a reasonable period of time. Element 200 is an address decoder for decoding a predetermined address on the line 127; this address acts as a read address for the processor 101. The data to be decoded is applied to the input register of the processor 101 each time in blocks of 16 bits until a sufficient amount of data has been received. Consequently, this data is also outputted in such blocks by the access station. Subsequently, the decoding and re-encoding operations are performed. The element 200 subsequently decodes a second predetermined address on the line 127 in order to control data output by the processor, again distributed over as many 16-bit data words as necessary. In the initiation state, decoding/re-encoding does not take place, because another part of the microprogram in the processor 101 is then executed only once. One feasible embodiment consists in that after the initiation (taking place in the described manner as far as the data transport is concerned) an irreversible modification is introduced inside the processor by a special signal on terminal 201. This may be, for example, the blowing of a fuse. Subsequently, the described initiation part of the microprogram will never be executed again, but encoding/decoding takes place immediately. The calculations or other processing steps of the microprograms per se are conventional; the special aspect of the code is each time given by the encoding/decoding key.

DESCRIPTION OF THE FLOW CHART

Figure 3:
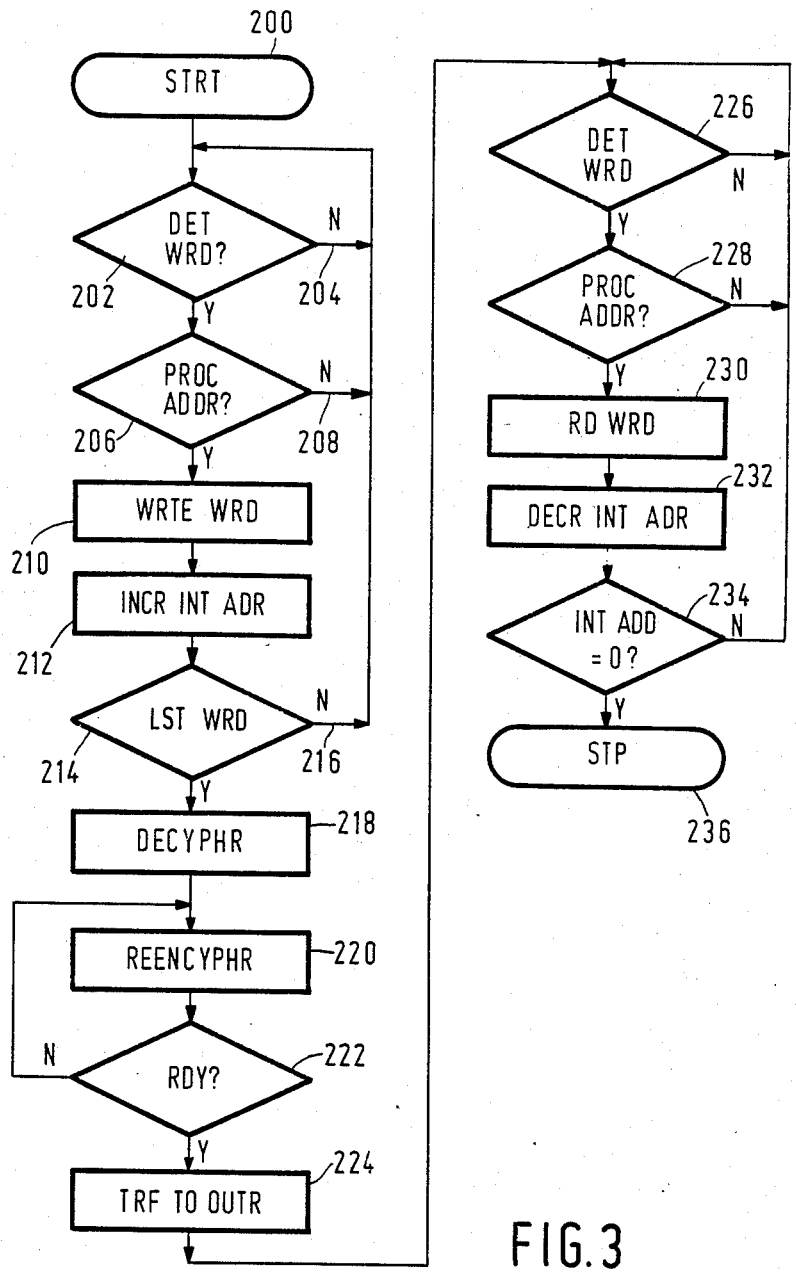
FIG. 3 is a flow chart concerning the interaction between an access station and an external station.

FIG. 3 is the flow chart of the validation process. Block 200 represents the start where the relevant voltages reach the appropriate values, the clock pulses are activated and the registers are reset to zero, if necessary.

Block 202 represents the detection by the word detector. If no word is detected thereby, the system enters a waiting loop 204. When a word is detected, in block 206 it is detected whether the microprocessor 101 is addressed by a write operation. If this is not so, a second waiting loop 208 is entered. If the microprocessor is addressed (this detection thus verifies 5 word bits, 5 address bits and two control bits, so 12 bits in total), in block 210 the data (16 bits) is transferred from the relevant word to a number of start registers of the processor; in block 212 the associated pointer (internal address) is incremented. In block 214 it is detected whether all code words (fixed number) have been received. If this is not the case, the system returns to block 202. When all words have been received, in block 218 the (first) decoding algorithm is performed by means of the program stored in the read-only memory and the decoding key stored in the programmed memory. Subsequently, using the second encoding key, the decoded message is encoded again (block 220). This takes place in a sequence of steps. In block 222 it is detected whether the last step has been completed. For as long as this is not the case, the system returns to the block 220. When the last step has been completed, the encoded message is applied to a number of output registers in block 224. Exclusively these registers and no other storage position of the processor can be read from the outside. They are indicated by the same indicator as in block 212; this indicator now counts in the opposite direction. The blocks 226–234 constitute counter parts of the blocks 202, 206, 210, 212, 214, be it that now the output registers are read for outputting the successively received data words. When the last word has been read (block 234), the process has been completed (block 236).

The procedure in the access station is similar, be it that the entire process now commences with the generating of random information which is directly encoded in a block which corresponds to the block 220 of FIG. 3 (be it by means of the first encoding key). Subsequently, the data is transferred (correspondence to the blocks 224 to 234) and subsequently the reception of the newly encoded data is awaited (correspondence to the blocks 204 to 214). The latter data is decoded (correspondence to block 218, be it by means of the second decoding key) and compared with the originally encoded data. In the case of correspondence, the external station is identified as being legitimate and data communication processes may commence as described in the incorporated reference, or the operations for dispensing money or data by the system (access station or central data processing device) can be performed. The present invention does not relate to the latter per se.

The initiation of the external station can also be performed in a similar manner; in that case, in FIG. 3 a dummy encoding key is used as the first encoding key. The decoding in block 218 is then also a dummy operation. The data itself which is transmitted during the initiation process then represents the first decoding key and the second encoding key. During reception of this data in the station, one or more address bits of the memory have a given value. After initiation by means of said data, a further write operation is made impossible for the memory addresses asssociated with the relevant address bit values. Subsequently, these address locations can no longer be externally read and writing therein is completely impossible. The data is thus protected against fraud. The initiation operations are performed in one or more special initiation stations. The construction of these initiation stations may be quite similar to that of the other access stations. In that case the generator is not of a random type, but has a memory function in which the encoding and decoding keys for the access station are stored, so that the decoding keys are suitably protected. The described procedures can also be performed in the reverse direction, the external station then generating unpredictable data which is verified by means of two encoding/decoding keys; the identity of the access station can thus also be verified by the external station.

What is claimed is:

1. A method for authenticating an electronic access card to a communication system having a plurality of access stations interconnected to a central data processing device, said method comprising the steps of:
    (a) coupling said access card to an access station by means of a bidirectional data channel;
    (b) generating a first message having random content in said access station and converting said first message to a first encrypted message by means of a locally resident first encoding key;
    (c) transferring said first encrypted message to said access card and decoding said first encrypted message by means of a locally resident first decoding key associated with said first encoding key in said access card;
    (d) converting said decoded first encrypted message to a second encrypted message in said access card by means of a locally resident second encoding key;
    (e) transferring said second encrypted message to said access station and decoding said second encrypted message by means of a locally resident second decoding key associated to said second encoding key in said access station;
    (f) comparing said decoded second encrypted message to said first message for selectively generating an authentication signal upon detection of equality, said method thereby entailing transfer of only encrypted representations of said first message in the form of first and second encrypted messages, respectively, wherein said first encoding key and said second encoding key are mutually different and wherein said first decoding key and said second encoding key are complementary among a predetermined plurality of access cards, and are externally inaccessible in said access cards.

2. A system for authenticating an electronic access card to a communication system, said communication system comprising a plurality of access stations interconnected to a central data processing device, and comprising:
    (a) coupling means in an access station for coupling thereto said access card via a bidirectional data channel;
    (b) a generator in said access station for a first random message and first encoding means fed by said generator for converting by means of a locally resident first encoding key said first random message to a first encrypted message for transferral via said data channel;
    (c) first decoding means in said access card fed by said data channel for decoding said first encrypted message by means of a locally resident first decoding key associated to said first encoding key;
    (d) second encoding means in said access card fed by said first decoding means for converting said decoded first encrypted message to a second encrypted message for transferral via said data channel by means of a locally present second encoding key;

(e) second decoding means in said access station fed by said data channel for decoding said second encrypted message by means of a locally resident second decoding key associated to said second encoding key;

(f) comparing means fed by said generator and by said second decoding means for comparing said first random message and said decoded second encrypted message and having an authentication output for upon detecting an equality outputting an authentication signal for enabling further data processing operations in said communication system;

said communication system thereby having only encrypted representations of said first random message transmitted on said data channel in the form of said first encrypted and second encrypted messages, respectively, wherein said first encoding key and said second encoding key are mutually different, wherein said first decoding key and second encoding key are complementary among a predetermined plurality of access cards, said access cards comprising storage means provided with access blocking means for blocking external access to said first decoding key and second encoding key.

3. An authenticatable electronic access card for use in a communication system having a plurality of access stations interconnected to a central data processing facility, said access card comprising:

(a) coupling means for coupling thereto an access station via a bidirectional data channel;

(b) a first decoding means fed by said data channel for receiving a first encrypted message as generated in said access station from a first random message by means of first encoding key, said first decoding means comprising storage means for a first decoding key associated with said first encoding key for controlling said first decoding means to decode said first encrypted message;

(c) second encoding means fed by said first decoding means for converting by means of a locally present second encoding key said decoded first encrypted message for transferral via said data channel to said access station for decoding therein by means of a second decoding key associated with said second encoding key and thereupon being compared to said first random message for authentication, said access card thereby communicating only encrypted representations of said first random message on said data channel in the form of said first encrypted and second encrypted messages, respectively, wherein said first encoding key and said second encoding key are mutually different and wherein said first decoding key and said second encoding key are complementary among a predetermined plurality of access cards, said access card comprising storage means provided with access blocking means for blocking external access to said first decoding key and second encoding key.

* * * * *